(No Model.)
A. HOUGH.
SECONDARY BATTERY.
No. 512,823. Patented Jan. 16, 1894.
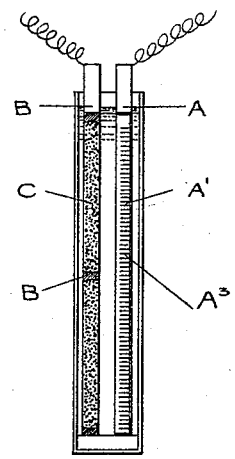
— FIG 1.
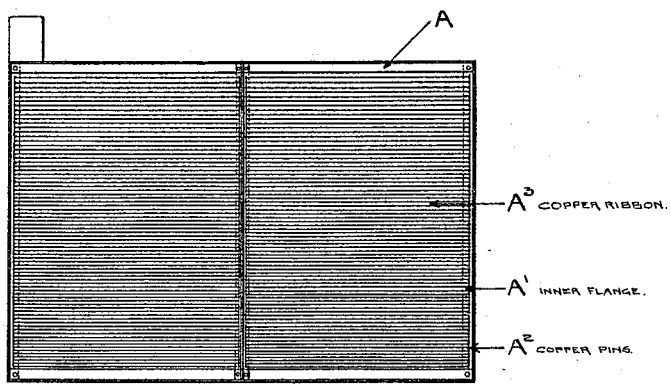
— FIG. 2.
$A^3$ COPPER RIBBON.
$A'$ INNER FLANGE.
$A^2$ COPPER PINS.
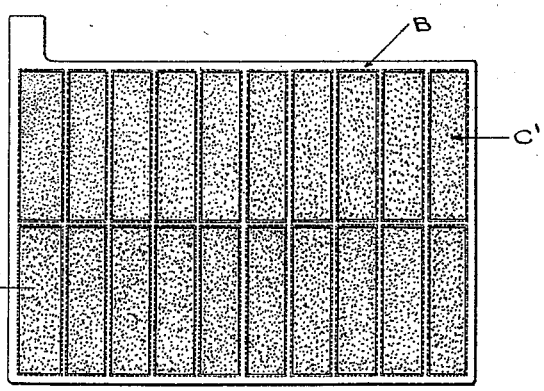
— FIG. 3.
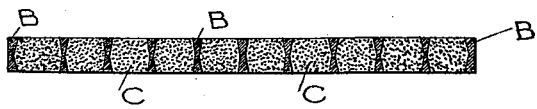
— FIG. 4.
WITNESSES
Arthur Hough INVENTOR.
By E. F. Murdock ATTORNEY.
THE NATIONAL LITHOGRAPHING COMPANY,
WASHINGTON, D. C.

UNITED STATES PATENT OFFICE.

ARTHUR HOUGH, OF SAN FRANCISCO, CALIFORNIA.

SECONDARY BATTERY.

SPECIFICATION forming part of Letters Patent No. 512,823, dated January 16, 1894.

Application filed September 14, 1893. Serial No. 485,478. (No model.)

*To all whom it may concern:*

Be it known that I, ARTHUR HOUGH, a subject of the Queen of Great Britain, residing at San Francisco, in the county of San Francisco and State of California, have invented certain new and useful Improvements in Secondary Batteries; and I do hereby declare the following to be a full, clear, and exact description of said invention, such as will enable others skilled in the art to which it most nearly appertains to make, use, and practice the same.

This invention relates to improvements in secondary batteries and consists in the novel construction and arrangement of the parts as hereinafter set forth.

It has for its objects to obtain large storage capacity, to reduce the weight to a minimum and to prevent the buckling and bursting of the plates incident to the batteries now in use.

In the drawings: Figure 1 is a cross section of the battery constructed in accordance with this invention. Fig. 2 is a front view of the frame for the spongy lead element without the active material. Fig. 3 is a front view of the peroxide plate showing the slabs of active material. Fig. 4 is a cross section of same.

The letters "A" and "B" of the drawings designate respectively the frame of the spongy lead and per-oxide plates of this improved battery. In the former I use copper because of its lightness and conductivity. This frame I construct of angle pieces to obtain rigidity of form. The inner flanges "A'" I perforate at short intervals and in the perforations I insert small pins "$A^2$" securing them rigidly therein by soldering. These pins "$A^2$" I place on two opposite sides only. Between them I lace the copper ribbon "$A^3$" in the manner shown forming a network between the sides of the frame. By securing the ends of this ribbon rigidly to the frame I have a light and durable support for my active material. When the frame is thus formed I dip it into molten alloy of lead to prevent local action between the spongy lead or active material, and the copper and thereby avoid loss of power incident thereto.

It is obvious that while I have described the use of the ribbon "$A^3$" I do not intend to limit myself to its use only, as by the substitution of wire lacings or wire gauze I may obtain the same results without deviating from the spirit of this invention.

The active material used in both plates "A" and "B" is constructed of the same components and mixed in the same way. These component parts are twelve parts of mon-oxide of lead, one part of sulphate of ammonia and one part of sulphate of magnesia. These are mixed preferably dry. When applying the active material to the frame it is laid flat and the dry mixture described is poured evenly over it in between the laced ribbon "$A^3$" until the edges of the same are covered. The powder is then moistened by applying to it cloths saturated with water preferably hot. As the powder gradually absorbs the moisture the sulphate of ammonia is decomposed, the ammonia passing off, and sulphate of lead is formed rendering the mixture hard and crystalline. The plate should be allowed several hours for this process. After this time has elapsed and the plate has become hard it can be readily handled. It is then submerged bodily in warm water to dissolve out the sulphate of magnesia and by so doing render the plate porous. The remaining ingredients left in the plate are mon-oxide of lead in combination with sulphate of lead rendered porous by the dissolving of the sulphate of magnesia. When subjected to the electrolytic action of the current the mon-oxide of lead is then reduced to spongy lead. When in use this spongy lead plate by reason of its large capacity for the absorption of oxygen prevents the oxidation and dissolution of the copper frame, while the copper by reason of its interlaced construction has a large surface contact with the spongy lead or active material and serves to readily and rapidly draw off the current from this element.

In forming the plates "B" I prefer to first construct the active material into the desired shape and then cast the frame or support around it. The active material used in this plate is constructed of the same component parts as described above, mixed in the same way. These plates I prefer however to form in solid slabs all molded together in a frame. For this purpose I construct the little slabs "C" in molds of the desired shape—(preferably oblong with wedge shaped edges)—and pass them through the same process as described above, for hardening and rendering porous. When so hardened and rendered porous these slabs are "formed" or converted into per-oxide of lead. This I accomplish by immersing the slabs in a suitable electrolyte preferably alkaline and passing a current through them for several hours in the usual way. In this process the slabs are fully expanded or formed and will not again contract or further expand. The slabs are now taken from the bath and thoroughly dried ready for framing. When the desired number of these slabs have been formed they are arranged as desired and molten alloy of lead is poured between them forming a frame which as the slabs are placed close together is as light as can be obtained with lead. When now the battery is charged the slabs "C'" will not expand and buckle the frame as in other batteries. For this reason I am able to use lighter frames, needing no reinforcing.

When complete the plates "A" and "B" are placed in a suitable electrolyte and charged and discharged in the usual way, the copper support in the oxide plate being protected by the large absorption capacity of oxygen by spongy lead.

In a contemporaneous application, Serial No. 493,667, filed December 14, 1893, I have shown and claimed the mechanical structure herein set forth together with the specific method set forth and the broader method of formation without including the sulphate of ammonia, the subject matter being set forth in the present case in order that the invention claimed herein may be fully understood.

Having thus described this invention, what I claim is—

In a secondary battery the method of constructing active material consisting in mixing mon-oxide of lead, sulphate of ammonia and sulphate of magnesia, and when mixed decomposing the sulphate of ammonia and dissolving the sulphate of magnesia substantially as set forth.

In testimony whereof I have hereunto set my hand this 7th day of September, 1893.

ARTHUR HOUGH.

In presence of—
J. M. BECK,
L. G. HARVEY.